US012109836B1

(12) United States Patent
Briggs

(10) Patent No.: US 12,109,836 B1
(45) **Date of Patent: *Oct. 8, 2024**

(54) BALLPOINT DOT PEN TATTOO CARTRIDGE

(71) Applicant: Corbin Briggs, Redding, CA (US)

(72) Inventor: Corbin Briggs, Redding, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,356

(22) Filed: Apr. 1, 2024

Related U.S. Application Data

(63) Continuation of application No. 18/302,722, filed on Apr. 18, 2023, now Pat. No. 11,951,763.

(60) Provisional application No. 63/435,198, filed on Dec. 23, 2022.

(51) Int. Cl.
*B43K 7/02* (2006.01)
*B43K 7/10* (2006.01)

(52) U.S. Cl.
CPC . *B43K 7/02* (2013.01); *B43K 7/10* (2013.01)

(58) Field of Classification Search
CPC ... B43K 7/02; B43K 7/10; B43K 5/16; B43K 5/165; B43K 7/12; B43K 24/02; B43K 24/04; B43K 24/06; B43K 24/08
USPC .................................. 401/109–112, 116, 117
See application file for complete search history.

(56) References Cited

U.S. PATENT DOCUMENTS

| | | | | |
|---|---|---|---|---|
| 11,400,425 | B2 * | 8/2022 | Merillat ............ | A61M 37/0084 |
| 11,857,749 | B2 * | 1/2024 | Siciliano ................ | H01R 31/06 |

* cited by examiner

*Primary Examiner* — David J Walczak

(57) ABSTRACT

A ballpoint dot pen tattoo cartridge includes a ballpoint pen element comprising an ink reservoir housed within a tapered bottom barrel providing a first barrel aperture and flanged top surface. A second barrel aperture in cylindrical top of the barrel includes a diameter larger than the first aperture with an assembly to attach the barrel cylindrical top to a tattoo machine. A resilient element within the barrel is sized to receive the ballpoint pen element between the first barrel aperture flanged top surface and two equal sized tabs on the ballpoint pen providing exit and retraction of the ballpoint pen assembly for ink discharge from the cartridge barrel tapered bottom whereby a tattoo machine operator controls the driving actuation of the tattoo machine to the ballpoint pen tip for controlling inked markings of a material.

6 Claims, 3 Drawing Sheets

BALLPOINT DOT PEN TATTOO CARTRIDGE

CROSS-REFERENCES TO RELATED APPLICATIONS

This United States non-provisional patent application is based upon and claims the filing date of U.S. non-provisional patent application Ser. No. 18/302,722 filed Apr. 18, 2023, which was based upon U.S. provisional patent application Ser. No. 63/435,198, filed Dec. 23, 2022.

BACKGROUND

Field of the Invention

The invention relates to a ballpoint dot pen tattoo cartridge.

Background

There are various means for using a tattoo machine on paper. Some of these devices attempt to provide tattoo machine users with a product that allows for their machines on paper, but these solutions fail to meet the needs of the industry because not all versions of these products are manufactured. Therefore, there is not enough supply to meet demand. All versions of this product are expensive when they should be affordable and accessible to anyone. Other expensive versions can be found only abroad, while less durable versions still cost upwards of $50 to $80 wholesale. Other products attempt to offer a practice tool to new students of tattooing or art enthusiasts, but these products cannot meet the needs of the industry since the process of use is not similar enough to the actual process of tattooing. New tattoo artists lack experience in correct practice for tattoo machine control. Still, other products seek to offer a useful art tool and practice tool, but these also fail to meet industry needs because no products are manufactured. Thus, there is not enough supply to meet the demand.

SUMMARY OF THE INVENTION

It would be desirable to have a ballpoint pen in a tattoo cartridge to allow for practice on paper with a tattoo machine. It would be desirable to have a device that gives tattoo artists the ability to create art on paper with their tattoo machine. Still, further, it would also be desirable to have a device that provides the beginner tattoo artists the tactile feedback of how it feels to use a tattoo machine on paper before using it on artificial or real skin. The disclosed device advantageously fills these needs and addresses deficiencies in existing products by providing a practice tool and new way of using a tattoo machine on paper to create art. The ballpoint pen in a tattoo cartridge allows the tattoo artist to use their personal machine to enhance their tattoo services skill. The disclosed ballpoint dot pen tattoo cartridge is the perfect tool for any tattoo apprentice or professional as it instills muscle memory for better hand control and allows the tattoo artist to practice and learn techniques used in tattooing for example, pendulum, whip, or stipple shading.

Disclosed is a ballpoint dot pen tattoo cartridge, which includes these components: a cartridge cap, a ballpoint pen, resilient spring, and cartridge casing. These components are assembled with the cartridge cap clicked into the top of the cartridge casing. A hole centered on the cap and extending along a cartridge casing longitudinal axis equals the diameter of the ballpoint pen, allowing the ballpoint pen to move freely up and down within cartridge casing, and to extend from and retract into the cartridge casing. In an embodiment, a resilient spring is fixed to the ballpoint pen and allows the ballpoint pen to move up and down within the cartridge casing without falling out of the cartridge casing. This embodiment cartridge casing fits into a tattoo machine and contains the cartridge casing cap, resilient spring, and ballpoint pen.

Embodiments of ballpoint dot pen tattoo cartridge provide: (1) a resilient assembly element that allows for the ballpoint pen to move out of the cartridge casing and then retract into the cartridge casing; (2) a plastic attachment assembly on the top of the cartridge casing allowing for the whole ballpoint dot pen tattoo cartridge to lock into a tattoo machine; (3) a cap that clicks into the top of the cartridge casing and which holds the ballpoint pen and rubber sleeve or metal spring in the cartridge; and (4) a cartridge casing that contains the cartridge casing cap, the ballpoint pen, and the a resilient assembly, either a rubber sleeve or metal spring.

The disclosed ballpoint dot pen tattoo cartridge is unique when compared with other known devices and solutions because it provides: (1) an affordable product for tattoo enthusiasts, tattoo students or apprentices and tattoo artists; (2) a product that feels and functions like the actual tattoo needle down to the packaging; and (3) a product that is readily manufactured, providing a supply that meets existing demand from the tattoo and art communities and people who would like to learn how to tattoo.

The disclosed ballpoint dot pen tattoo cartridge is unique because it is structurally different from other known devices or products. The ballpoint dot pen tattoo cartridge provides (1) an integral tattoo cartridge configuration; (2) the ballpoint pen element is housed within the dot pen cartridge; and (3) the ability to readily adapt to a tattoo machine.

This disclosure provides a more detailed and specific description that will refer to the application drawings. The drawings and specific descriptions of the drawings, and any specific or alternative embodiments discussed, are read with this entire disclosure. The ball point dot pen tattoo cartridge may, however, be embodied in many forms and should not be construed as limited to the embodiments set forth herein. Rather, these embodiments are provided by way of illustration only and so this disclosure will be thorough, complete, and convey understanding to those skilled in the art.

DETAILED DESCRIPTION

The present invention is directed to embodiments for a ballpoint dot pen tattoo cartridge 10, as depicted is FIGS. 1-6B.

Figure 1:
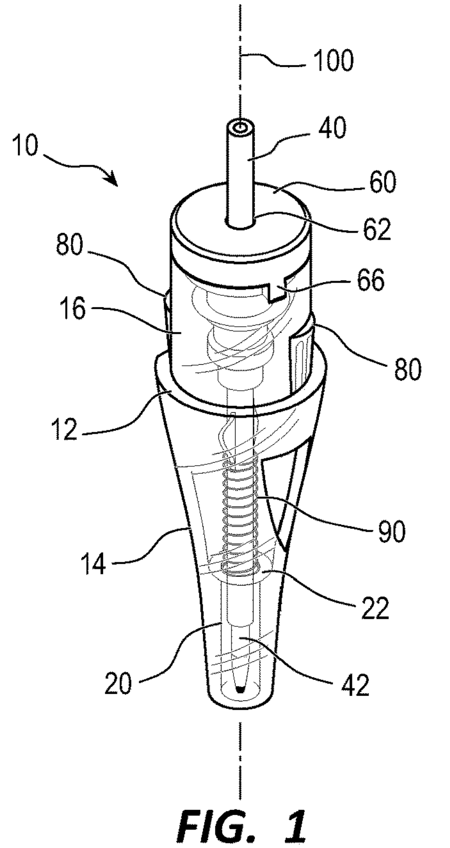
FIG. 1 depicts a perspective view of an embodiment of the ballpoint dot pen tattoo cartridge 10 without driving actuation force on the ballpoint pen element 40 whereby the ballpoint pen element ink discharge tip 42 is retracted in the first barrel cartridge barrel aperture 20 and the integral cartridge barrel tapered bottom 14.
Figure 2:
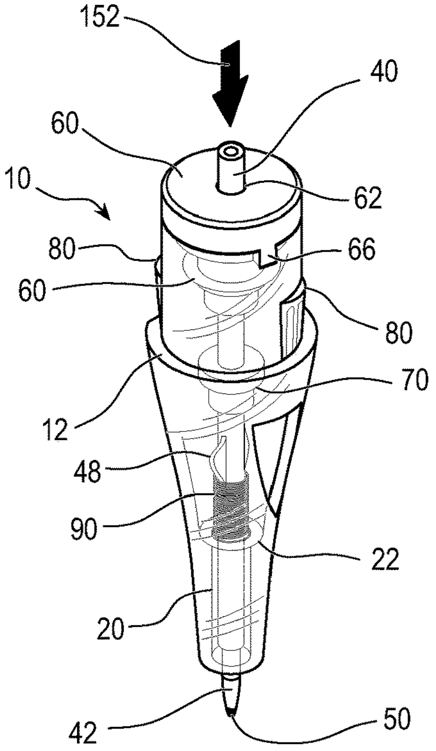
FIG. 2 depicts the embodiment of the ballpoint dot pen tattoo cartridge 10 of FIG. 1 wherein the driving actuation force 152 on the ballpoint pen element 40 compresses the resilient assembly element 90 within the integral cartridge barrel 12 whereby the ballpoint pen element ink discharge tip 42 is extended from the first barrel cartridge barrel aperture 20 and the integral cartridge barrel tapered bottom 14.
Figure 3:
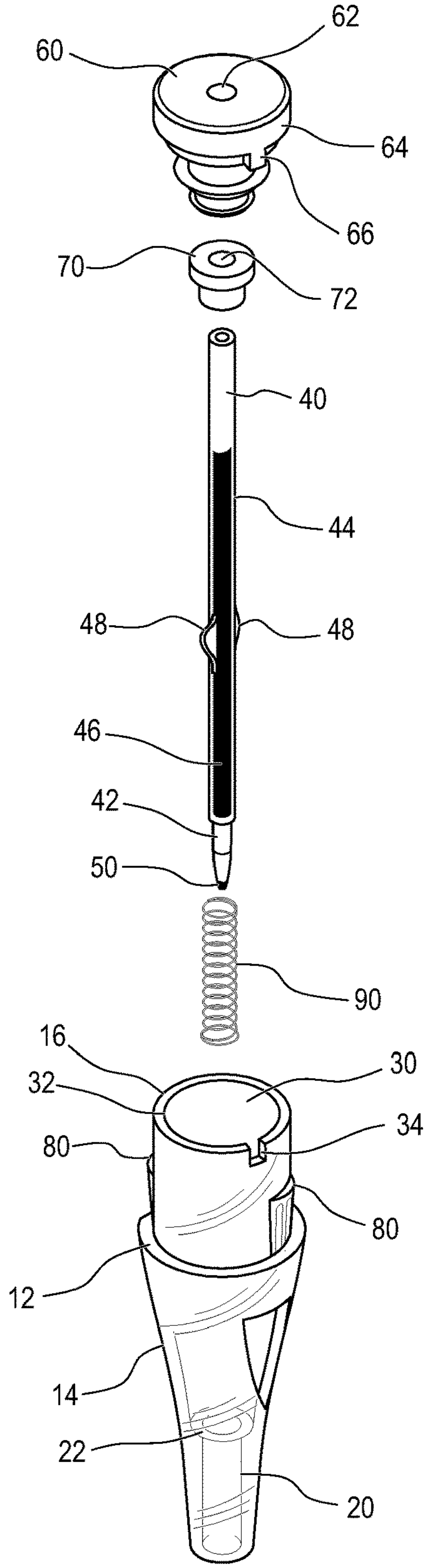
FIG. 3 depicts an exploded perspective view of the ballpoint dot pen tattoo cartridge 10 of FIG. 1.

An embodiment of the ballpoint dot pen tattoo cartridge 10 includes an integral cartridge barrel 12 having a longitudinal centerline axis 100, FIG. 1, a first cartridge barrel aperture 20 centered on and along the longitudinal centerline in a tapered bottom 14 of the cartridge barrel comprising a flanged top surface 22 at a top portion of the first cartridge barrel aperture 20, FIGS. 1-3. A second barrel aperture 30 is centered on and along the longitudinal centerline axis 100 at a cylindrical top 16 of the cartridge barrel 12 and includes a diameter larger than the first barrel aperture 20 and a locking indent 34 on a second barrel aperture top surface 32, FIG. 3.

An embodiment of the ballpoint dot pen tattoo cartridge 10 includes a ballpoint pen element 40 comprising an ink reservoir and sized to be received within the first cartridge barrel aperture 20, FIGS. 1-3. The ballpoint pen element includes 40 an ink discharge tip 42, an elongate shaft 44 comprising an ink reservoir 46 and two equal sized tabs 48 on opposite sides of the ballpoint pen element 40 are provided at an equal distance slightly below a ballpoint pen element elongate shaft 44 midpoint. The ballpoint pen element 40 further provides a pen ink discharge tip 42 having a ballpoint pen assembly 50 for ink discharge.

An embodiment of the ballpoint dot pen tattoo cartridge includes a cartridge barrel cap 60 sized to releasably fit into and be held by the second barrel aperture 30. Rib assembly 80 provided on opposite external sides of the second barrel aperture 30 are sized to be received into the tattoo machine 150 and held thereby attach the cylindrical top 16 of the cartridge barrel 12 to a the tattoo machine 150. A central cap aperture 62 is sized to receive the ballpoint pen element 40, and a locking detent 66 on a cap top circumference 64 sized to be received into the second barrel aperture top surface 32, FIGS. 1-3, 5A, and 5B.

An embodiment of the ballpoint dot pen tattoo cartridge includes a resilient assembly element 90 within the integral cartridge barrel 12, sized to receive the ballpoint pen element 40 between the first barrel aperture flanged top surface 22 and the ballpoint pen two equal sized tabs 48 providing means for movement of the ballpoint pen element 40 within the cartridge barrel 12 and exit and retraction of the ballpoint pen assembly for ink discharge 50 from the first barrel cartridge barrel aperture 20 and the integral cartridge barrel tapered bottom 14, FIGS. 1-3.

Figure 6A:
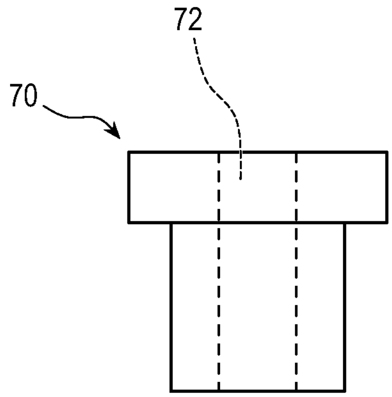
FIG. 6A depicts an elevational view of the cartridge barrel ballpoint pen stabilizing element 70 for the embodiment of the ballpoint dot pen tattoo cartridge 10 of FIG. 1.
Figure 6B:
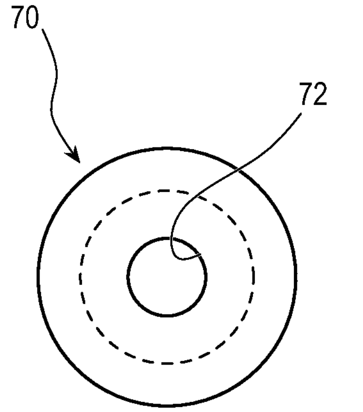
FIG. 6B depicts a planar top view of FIG. 6A.

An embodiment of the ballpoint dot pen tattoo cartridge includes a cartridge barrel ballpoint pen stabilizing element 70 sized to be within the integral cartridge barrel 12 between a bottom portion of the cartridge barrel cap 60 and above the two equal sized tabs 48 on opposite sides of the ballpoint pen element and providing a stabilizing element aperture 72 sized to receive the ballpoint pen element 40, FIGS. 3, 6A, and 6B.

Figure 4:
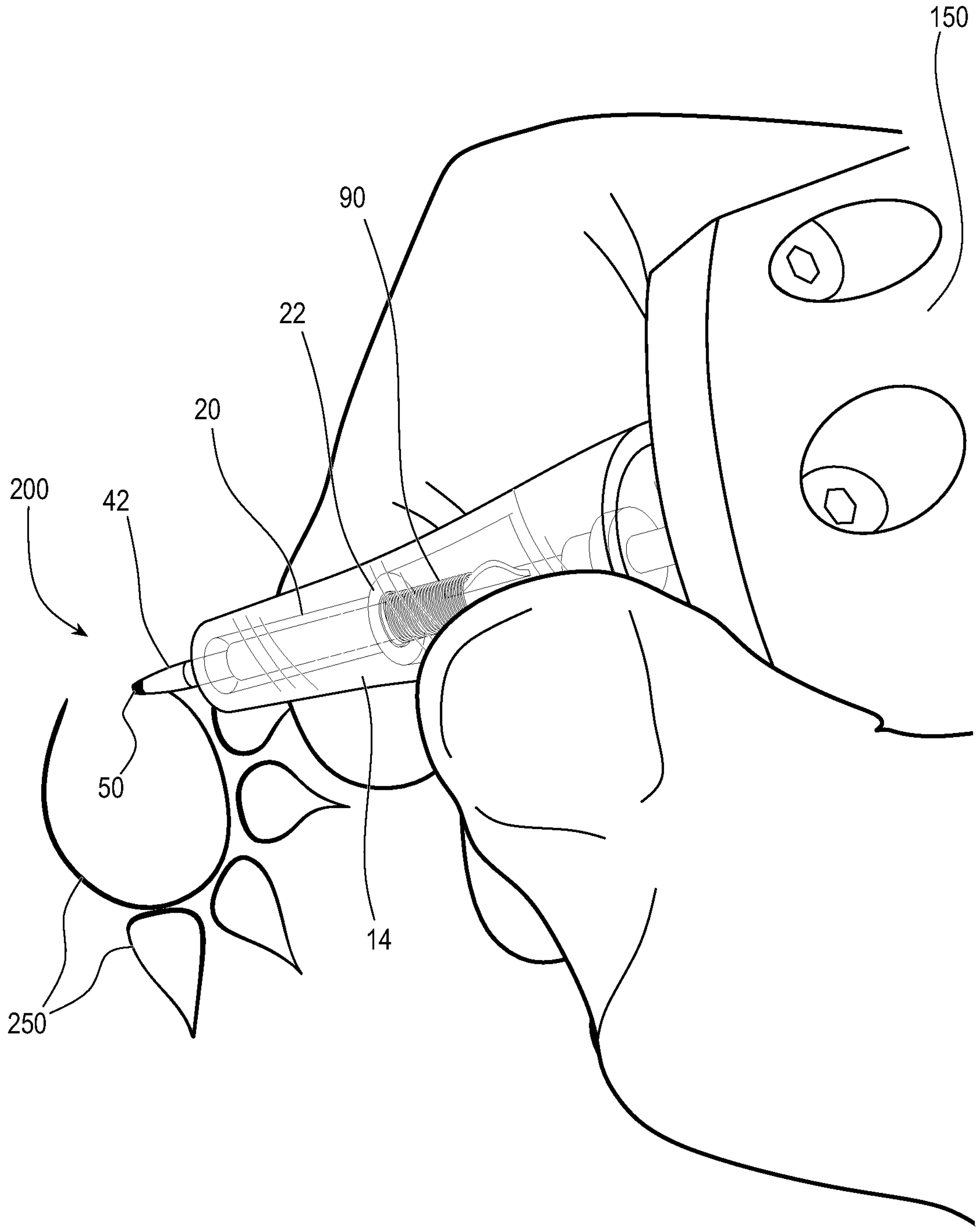
FIG. 4 depicts embodiment of the ballpoint dot pen tattoo cartridge 10 of FIG. 1 used by a tattoo machine operator controlling the driving actuation of the tattoo machine 150 to the ballpoint pen ink discharge tip 42 and thus controls marking of the material 200 with the ballpoint pen element pen ink discharge tip and ink 250.
Figure 5A:
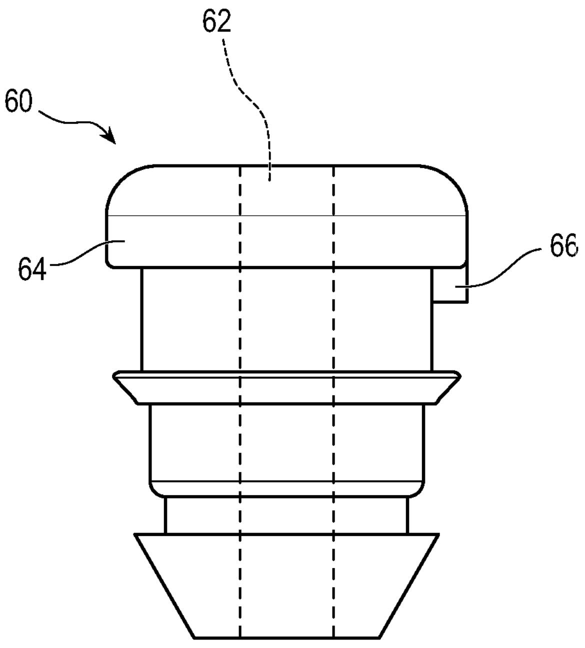
FIG. 5A depicts an elevational view of the cartridge barrel cap 60 for the embodiment of the ballpoint dot pen tattoo cartridge 10 of FIG. 1.
Figure 5B:
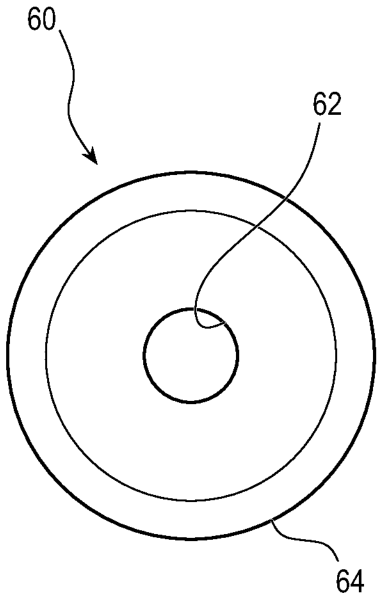
FIG. 5B depicts a planar top view of FIG. 5A.

The driving actuation force 152 of the tattoo machine 150 to the ball point pen element 40 causes the ballpoint pen element ink discharge tip 42 to reciprocate within the integral cartridge barrel 12 between one or more extended and retracted positions from the first barrel cartridge barrel aperture 20 and the integral cartridge barrel tapered bottom 14 allowing the ball point pen ink discharge tip 42 to dispose ink from the ballpoint ink reservoir onto a material 200, FIGS. 1, 2 and 4. The tattoo machine operator controls the driving actuation force 152 of the tattoo machine 150 to the ballpoint pen ink discharge tip 42 and thus controls marking of the material 200 with the ballpoint pen element pen ink discharge tip and ink 250, FIG. 4.

Different features, variations and multiple different embodiments have been shown and described with various details. What has been described in this application in terms of specific embodiments is done for illustrative purposes only and without the intent to limit or suggest that what has been conceived is only one embodiment or specific embodiments. It is to be understood this disclosure is not limited to any single specific embodiments or enumerated variations. Many modifications, variations and other embodiments will come to mind of those skilled in the art, and which are covered by this disclosure. It is intended that the scope of this disclosure should be determined by a proper legal interpretation and construction of the disclosure, including equivalents, as understood by those of skill in the art relying upon the complete disclosure present at the time of filing.

I claim:

1. A ballpoint dot pen tattoo cartridge, comprising:

A) a cartridge barrel comprising an externally disposed rib assembly to attach a cylindrical top of the cartridge barrel to a tattoo machine;

B) a ballpoint pen element comprising i) an ink reservoir sized to be received within the cartridge barrel, and ii) a ballpoint pen element tip comprising a ballpoint pen assembly for ink discharge from the ink reservoir;

C) a cartridge barrel cap sized to fit into and be held by a cartridge barrel aperture and attach a to the cylindrical top of the cartridge barrel;

D) a resilient assembly element within the cartridge barrel, sized to receive and hold the ballpoint pen element providing movement of the ballpoint pen element within the cartridge barrel and exit and retraction of the ballpoint pen element for ink discharge from the cartridge barrel;

E) a cartridge barrel ballpoint pen stabilizing element sized to be within the cartridge barrel between a bottom portion of the cartridge barrel cap and above two equal sized tabs on opposite sides of the ballpoint pen element, and comprising a stabilizing element aperture sized to receive the ballpoint pen element;

wherein a driving actuation force of the tattoo machine to the ball point pen element causes the ballpoint pen element tip to reciprocate along a longitudinal axis within the cartridge barrel between one or more extended and retracted positions from a cartridge barrel bottom aperture allowing the ballpoint pen element tip to dispose ink from the ink reservoir onto a material; and wherein a tattoo machine operator controls the driving actuation of the tattoo machine to the ballpoint pen tip for controlling marking of the material with the ballpoint pen element pen tip and ink.

2. The ballpoint dot pen tattoo cartridge of claim 1 wherein the resilient assembly element comprises a rubber sleeve.

3. The ballpoint dot pen tattoo cartridge of claim 1 wherein the resilient assembly element comprises a metal spring.

4. A ballpoint dot pen tattoo cartridge, comprising:

A) a cartridge barrel comprising i) a longitudinal axis, ii) a tapered bottom comprising a central aperture, iii) a capped top comprising a central aperture, iv) an externally disposed rib assembly to attach a cylindrical top of the cartridge barrel to a tattoo machine, and v) a longitudinal channel running a length of the cartridge barrel along the longitudinal axis from the tapered bottom to the capped top;

B) a ballpoint pen element comprising i) an ink reservoir sized to be received within the cartridge barrel longitudinal channel, and ii) a pen tip comprising a ballpoint pen assembly for ink discharge from the ink reservoir;

C) a resilient assembly element within the cartridge barrel, sized to receive the ballpoint pen element and provide movement of the ballpoint pen element within the cartridge barrel central aperture and exit and retraction of the ballpoint pen assembly from the cartridge barrel for ink discharge;

wherein a driving actuation force of the tattoo machine to the ball point pen element causes the ballpoint pen element pen tip to reciprocate within the cartridge barrel longitudinal channel between one or more extended and retracted positions from a cartridge barrel tapered bottom aperture allowing the ball point pen tip to dispose ink from the ballpoint ink reservoir onto a material; and wherein a tattoo machine operator controls the driving actuation of the tattoo machine to the ballpoint pen tip for controlling marking of the material with the ballpoint pen element tip and ink discharge from the ink reservoir.

5. The ballpoint dot pen tattoo cartridge of claim 4 wherein the resilient assembly element comprises a rubber sleeve.

6. The ballpoint dot pen tattoo cartridge of claim 4 wherein the resilient assembly element comprises a metal spring.

* * * * *